United States Patent [19]

O'Meara

[11] Patent Number: 4,906,092
[45] Date of Patent: Mar. 6, 1990

[54] RANGE DOPPLER SELF-REFERENCING IMAGING SYSTEM

[75] Inventor: Thomas R. O'Meara, Malibu, Calif.

[73] Assignee: Hughes Aircraft Company, Los Angeles, Calif.

[21] Appl. No.: 245,608

[22] Filed: Sep. 19, 1988

[51] Int. Cl.⁴ .......................... G01P 3/36; G01C 3/08; H04B 9/00; G01B 9/02
[52] U.S. Cl. ..................................... 356/28.5; 356/5; 356/4.5; 455/611; 73/657
[58] Field of Search .................... 455/611; 356/5, 28.5, 356/4.5; 73/657

[56] References Cited

U.S. PATENT DOCUMENTS

| | | |
|---|---|---|
| 3,764,213 | 10/1973 | O'Meara ................................. 356/5 |
| 3,877,813 | 4/1975 | Hayes et al. ........................... 356/5 |
| 4,011,445 | 3/1977 | O'Meara . |
| 4,044,247 | 8/1977 | Brown, Jr. . |
| 4,068,234 | 1/1978 | O'Meara . |
| 4,090,066 | 5/1978 | O'Meara . |
| 4,167,329 | 9/1979 | Jelalian et al. ........................ 356/5 |
| 4,818,100 | 4/1989 | Breen ..................................... 356/5 |

OTHER PUBLICATIONS

J. L. Smith et al., "Real-Time Optical Processing Using the Liquid Crystal Light Valve," J. of Appl. Photographic Engineering, vol. 5, No. 4, (Fall, 1979), pp. 236-243.

A. Yariv, "Introduction to Optical Electronics", California Institute of Technology, pp. 249-251, 256-257, 261-262.

Primary Examiner—Stephen C. Buczinski
Attorney, Agent, or Firm—V. D. Duraiswamy; W. K. Denson-Low

[57] ABSTRACT

A self-referencing target imaging system 10 capable of long range imaging at visible wavelengths is disclosed herein. The imaging system 10 of the present invention includes a transmitter 20 for illuminating a target 30 with a series of electromagnetic pulses P. The present invention further includes an apparatus 35, 40 and 45 for redirecting first R1 and second R2 reflections of each illuminating pulse P from first 32 and second 34 portions of the target 30, respectively. A frequency modulator 50 driven by a generator 55 shifts the frequency of each first reflection R1 to produce a reference reflection R1' corresponding to each illuminating pulse P. The present invention further includes an arrangement of reflective elements 60 and 65 for respectively combining the reference R1' and the second R2 reflections of each illuminating pulse P to generate a series of combined reflections. A detector 70 generates an imaging signal in response to the series of respectively combined reflections.

21 Claims, 7 Drawing Sheets

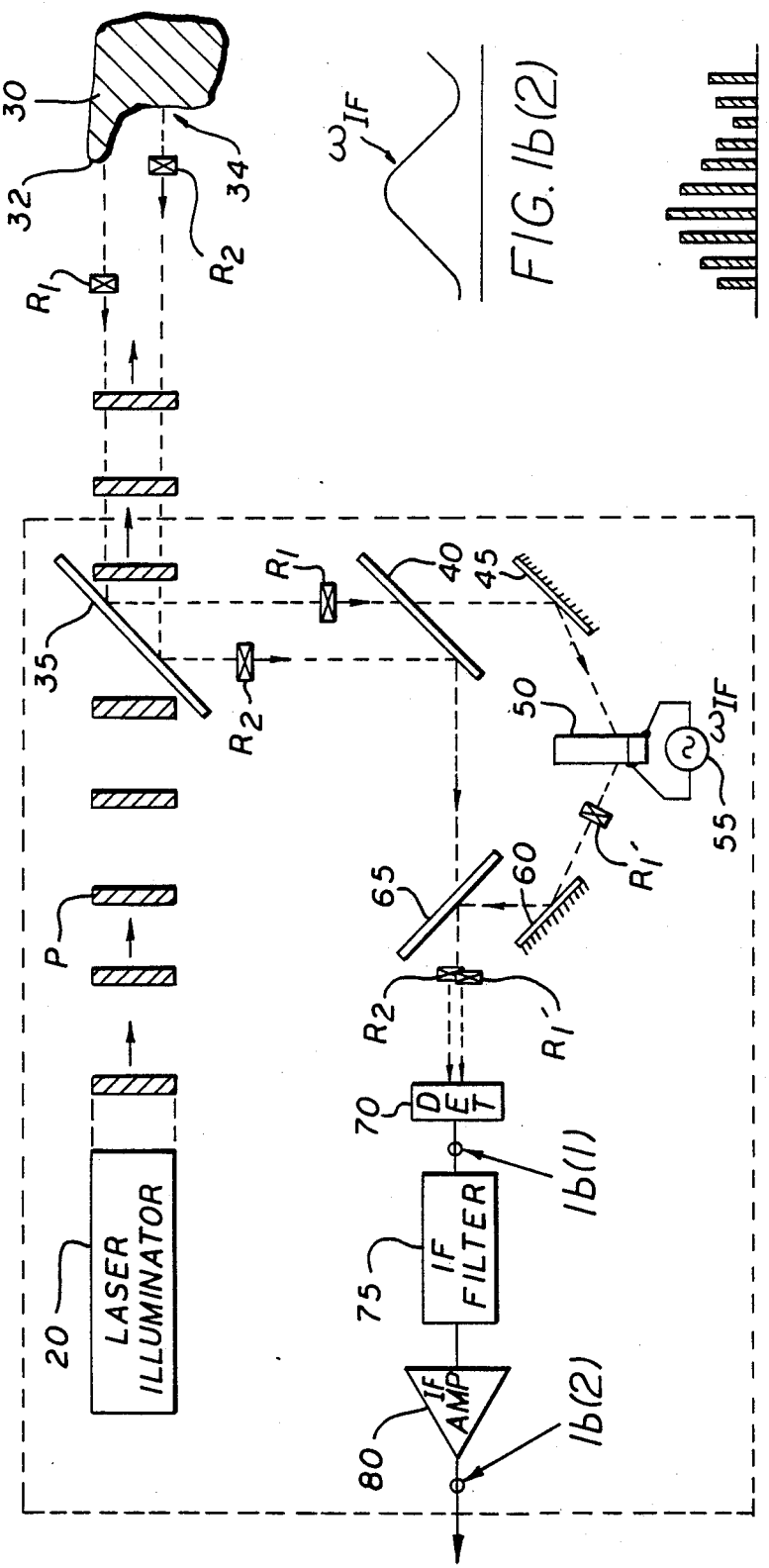

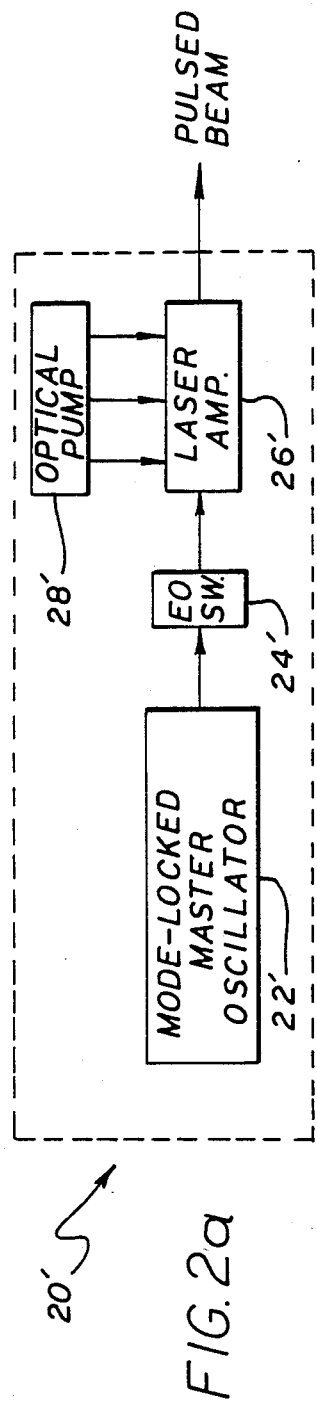
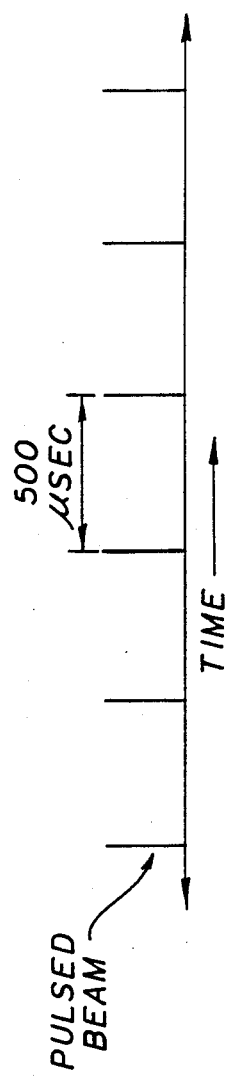
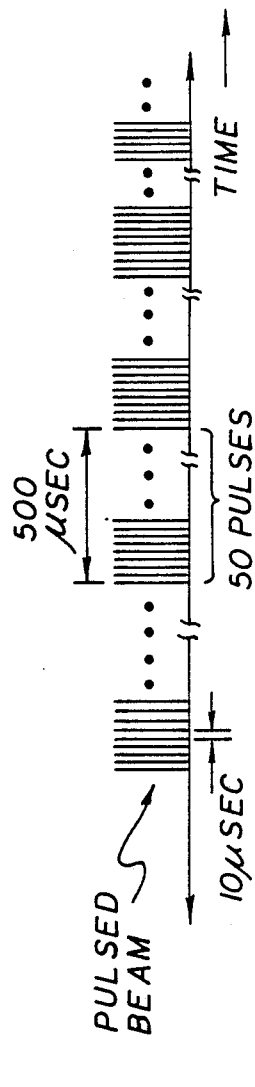

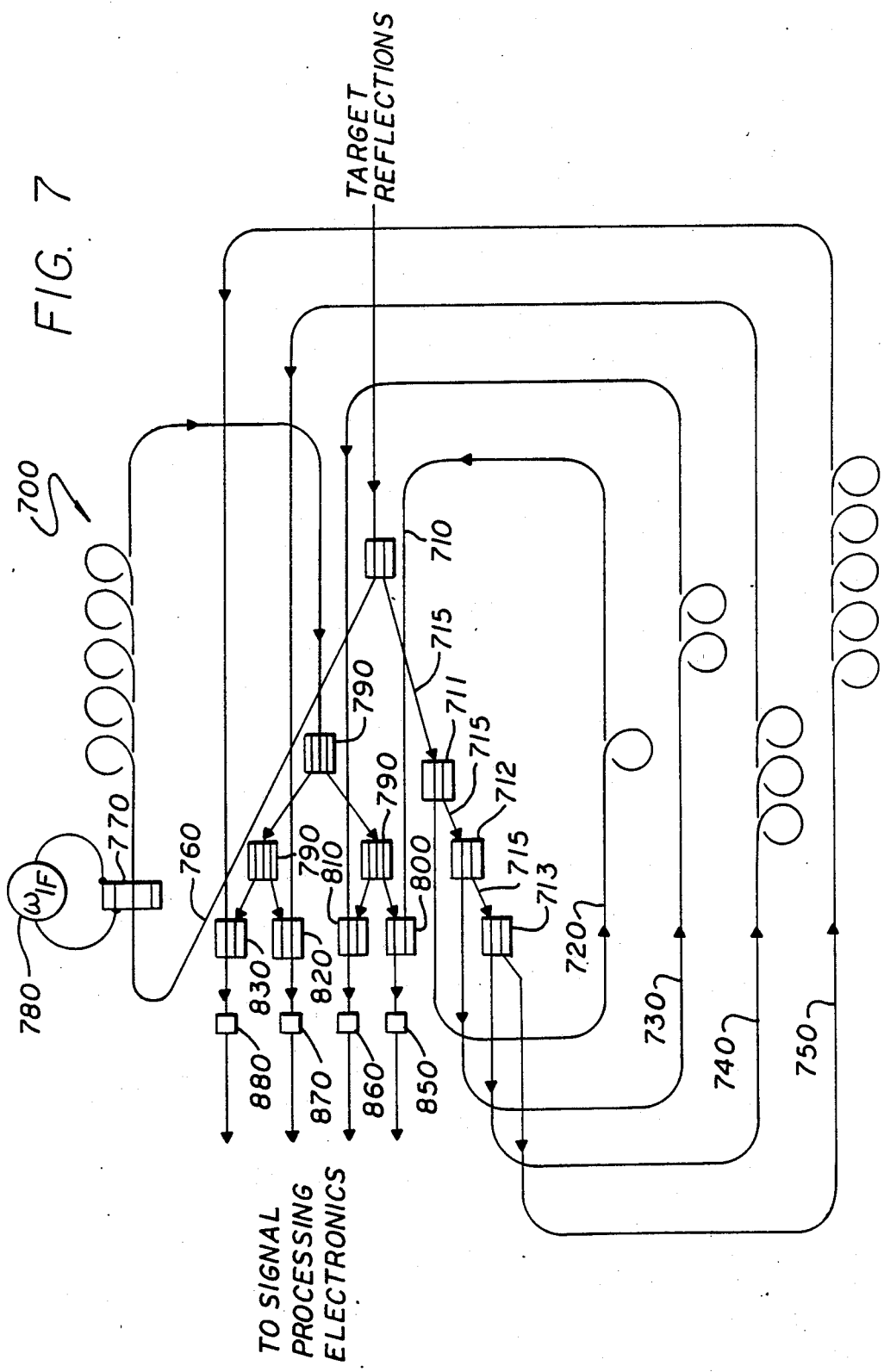

RANGE DOPPLER SELF-REFERENCING IMAGING SYSTEM

BACKGROUND OF THE INVENTION

1. Field of the Invention

The present invention relates to imaging systems. More specifically, the present invention relates to range Doppler imaging systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Range Doppler (RD) imaging systems are active imaging systems in which a target is illuminated by an electromagnetic beam. An image of the target is generated by extracting the differential Doppler shift information contained in the beam reflections from the target. The differential Doppler shift information is indicative of the relative motion or vibration of various target reflecting elements.

Conventional RD imaging systems are operative within the microwave and infrared regions down to wavelengths of approximately 10.6 microns and may be serviced by telescopes of moderate size.

Conventional long range imaging systems, as well as long range RD imaging systems, operating to ranges of 200 km and above require telescopes (or baselines) on the order of tens of meters (for visible radiation) to kilometers (for infrared radiation) to achieve a desired target resolution. (The baseline of an imaging system refers to the diameter of a receiving antenna array or the diameter of the aperture of a receive telescope.)

In addition to the practical difficulties encountered in constructing large baseline systems, both conventional and RD large baseline systems are susceptible to aberrations in the wavefronts of target reflections as received at the telescope when imaging through atmospheric turbulence. In the case of RD systems operating with large apertures, such wavefront aberrations typically destroy the spatial coherence between the target reflection and a local oscillator beam combined therewith prior to illumination of a detector. This lack of spatial coherence produces a weak and strongly fluctuating signal at the output of the detector. Hence, RD imaging systems are prone to sensitivity degradation due to atmospheric turbulence.

Further, the heterodyne detection apparatus typically employed in conventional RD systems requires that the target illuminator have a temporal coherence length on the order of the round trip distance from the illumination source to the target. Unfortunately, such coherence length problems tend to be exacerbated as the operational wavelength of the illumination source is reduced to afford enhanced target resolution. For example, long range RD systems are currently prevented from operating at visible wavelengths due to the unavailability of stable laser illuminators having coherence lengths of 400 km or longer. Further, the requisite laser local oscillator tuning range increases as the illuminating wavelength decreases. Hence, constraints on laser illuminators and local oscillators associated therewith limit the operating frequency spectrum of conventional imaging systems in long range applications.

Despite the obstacles mentioned above inherent in adapting conventional and RD imaging systems to shorter wavelength operation, successful realization of such systems at visible wavelengths would provide significant advantages. For example, many target surfaces which are extended diffuse scatterers at visible and shorter wavelengths do not behave as such in the longer wavelength infrared and microwave regimes. Thus, a larger percentage of a target can be imaged at visible wavelengths. Further, infrared detectors need to be cooled to attain near quantum limited performance while visible detectors do not.

Hence, a need in the art exists for a long range imaging system capable of operating at visible wavelengths.

SUMMARY OF THE INVENTION

The need in the art for a long range imaging system capable of operating at visible wavelengths is addressed by the self-referencing target imaging system of the present invention. The imaging system of the present invention includes a transmitter for illuminating a target with a series of electromagnetic pulses. The present invention further includes an apparatus for redirecting first and second reflections of each illuminating pulse from first and second portions of the target, respectively. A frequency modulator shifts the frequency of each first reflection to produce a reference reflection corresponding to each illuminating pulse. The present invention further includes an arrangement of reflective elements for respectively combining the reference and the second reflections of each illuminating pulse to generate a series of combined reflections. A detector generates an imaging signal, in response to the series of respectively combined reflections, on which the differential doppler spectrum associated with a particular target range is encoded.

BRIEF DESCRIPTION OF THE DRAWINGS

FIG. 1a is a simplified illustrative the self-referencing target imaging system of the present invention.

FIG. 1b(1) shows a sequence of current pulses generated by the optical detector of FIG. 1a.

FIG. 1b(2) shows the modulation envelope extracted from the current pulse sequence output by the optical detector.

FIG. 2a is an illustrative block diagram representation of a laser illuminator having a variable pulse repetition frequency.

FIG. 2b illustrates a pulse train generated by the illuminator of FIG. 2a at a pulse repetition frequency of 2 kHz.

FIG. 2c illustrates a sequence of pulse bursts at 2 kHz generated by the illuminator of FIG. 2a which provides a pulse train at an effective pulse repetition frequency of 100 kHz.

FIG. 4b illustrates the waveforms provided by the generators of FIG. 4a.

FIG. 7 is a second alternative preferred embodiment of the self-referencing target imaging system of the present invention incorporating fiber-optic delay lines.

DETAILED DESCRIPTION OF THE INVENTION

Figure 2D:
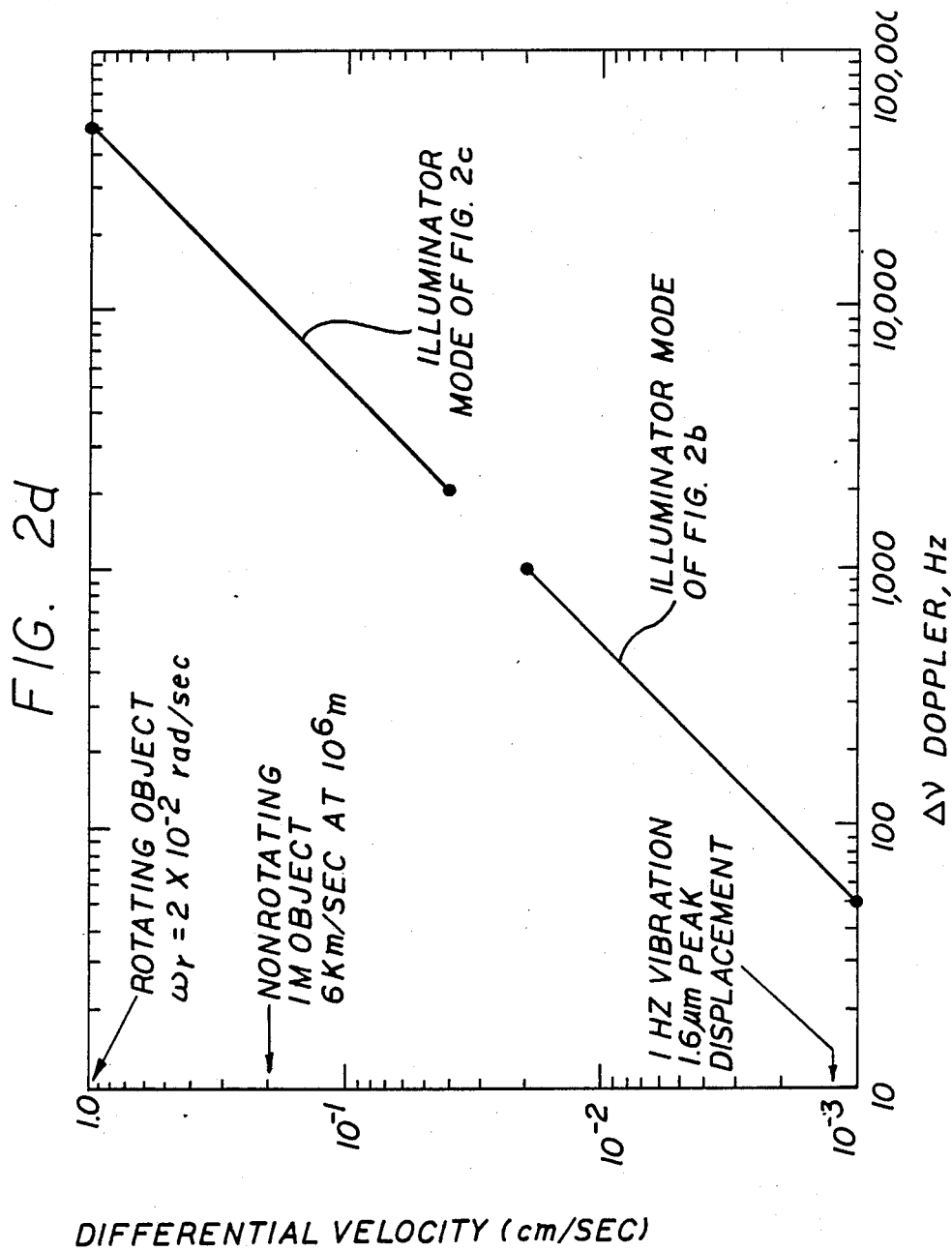
FIG. 2d is a graph showing the differential velocity measurements which may be extracted from a series of Doppler shifted reflections as a function of the illuminator modes of FIGS. 2b and 2c.

FIG 1a is a simplified illustrative embodiment of the self-referencing target imaging system 10 of the present invention. The system 10 is adapted for operation at visible wavelengths and utilizes a visible, mode-locked laser 20 having a high (20–30 Mhz) pulse repetition frequency (PRF) to illuminate a target 30. Each illuminator pulse P from the laser 20 is scattered by the target 30 to produce a train of reflections. A first and a second reflection, R1 and R2, included within a single reflection train are shown in FIG. 1a. The first reflection R1 is reflected from a convex leading surface 32 of the target 30 while the second reflection R2 is reflected by a surface 34. The reflections R1 and R2 are spatially separated by first and second beam splitters 35 and 40 and, in a preferred embodiment, by an optical switch network. The optical switch network has been omitted from FIG. 1a for clarity but will be discussed subsequently.

The first reflection R1 is reflected by a mirror 45 and frequency shifted by a conventional acousto-optic Bragg cell modulator 50 driven by an acoustical generator 55 at an intermediate frequency $\omega_{IF}$. The frequency shifted first reflection R1 is hereinafter referred to as a reference reflection R1'. The reference reflection R1' is redirected by a second mirror 60 to a third beam splatter 65. In this way the mirrors 45 and 60, and the beam splitters 40 and 65 serve to bring the reference and second reflections R1' and R2 into spatial and temporal registration. Upon recombination at the third beam splatter 65 the reflections R1' and R2 will coherently interfere, or beat. The composite intensity of this interference pattern is detected by a noncoherent detector 70. The frequency of the generator 55, plus or minus any differential Doppler shifts which occur between the reflections R1' and R2 due to relative motion between the surfaces 32 and 34 of the target 30, determines the beat frequency of the interference pattern. Such an interference pattern will be generated in response to reflections of each of the pulses P from the target 30. As the duration of each of the pulses P is short (typically on the order of sub-nanoseconds in duration) relative to the period of the generator 55, the output current of the detector 70 will appear as an extended train of current pulses having an envelope modulated at $\omega_{IF}$ for a stationary target 30. Relative motion between the surfaces 32 and 34 of the target 30 will result in phase or frequency modulation of the detection envelope. The detection envelope may be extracted from the ensemble of current pulses emitted by the detector 70 by an IF filter 75 and IF amplifier 80 centered about the IF frequency $\omega_{IF}$. In order to ensure extraction of a detection envelope representative of the modulation of the ensemble of current pulses from the detector 70 the IF frequency is normally chosen to be of the order of one third the laser PRF or less. The ensemble of current pulses from the detector 70 and the detection envelope extracted therefrom are illustrated in FIG. 1bt. Additionally, in certain embodiments the output of the amplifier 80 may be conventionally downconverted to facilitate subsequent signal processing.

In the simplified illustrative embodiment of FIG. 1a the system 10 is adapted to combine the reference reflection R1' and the reflection R2 from a particular "range bin" located at the surface 34. A range bin refers to a volume of space offset from surface 32, the source of the reference reflection R1'. In embodiments of the present invention to be discussed below, reflections from a plurality of range bins will be sequentially combined with portions of the reference reflection R1' to generate a plurality of of detection envelopes such as that shown in FIG. 1b. These individual detection envelopes are then processed by, for example, a digital computer to either generate an image of the target 30 or to develop alternative information thereabout. In the particular embodiment of FIG. 1a reflections which arrive at the detector 70 from range bins other than that which include the surface 34 will not be in temporal registration with the reference reflection R1' and hence will not produce an output from the detector 70 near $\omega_{IF}$. Hence, the simplified embodiment of the present invention of FIG. 1a provides a detection envelope shown in FIG. 1b responsive to reflections from the range bin which includes the surface 34.

As mentioned above, the laser PRF is typically chosen to be sufficiently high to sample the IF frequency at a rate of at least three samples per cycle. The particular laser PRF chosen is dependent on the size ad distribution of objects within the field of view of the laser illuminator 20. For example, in the case of a single object as shown in FIG. 1a within the illuminator 20 field of view the upper bound on the PRF is set by the requirement to spatially separate the pulses of the illuminator pulse train by a sufficient distance. The pulse separation should be at least twice the distance between the reference surface 32 and the most distant surface 34 of the target 30 to ensure that the reflections therefrom generated by separate pulses P do not overlap. For such single targets the laser PRF will typically be chosen between 20 and 40 MHz. However, the laser PRF stated above may need to be lowered to avoid ambiguities in the reflection sequence when multiple targets are present in the field of view of the illuminator 20. Hence, the laser PRF is typically selected based on the anticipated target distribution within the field of view of the illuminator 20.

While a constant laser PRF may be adequate in certain imaging applications, targets generating reflections having a wide range of differential Doppler frequencies may require a continuously or discretely variable PRF. FIG. 2a is a block diagram representation of a laser illuminator 20' having a variable PRF. The illuminator 20' includes a master-oscillator 22' which is assumed to be mode-locked and generates a series of optical pulses at a fixed, generally high frequency (e.g. 40 MHz). A conventional electro-optic switch 24' passes subsets of the pulses produced by the oscillator 22, to a laser power amplifier 26'. The lasing medium within the laser amplifier 26' is assumed to be capable of holding an inverted population state for at least 500 microseconds without substantial loss due to spontaneous emission. An optical or electrical pump 28' (e.g. a flash lamp) may therefore be employed to pump the laser amplifier 26, at a frequency on the order of 2 kHz. As shown in FIG. 2b, the illuminator 20' may be utilized to generate a continuous pulse train at a PRF of 2 kHz. Alternatively, the switch 24' may be controlled such that the illuminator 20' generates the sequence of pulses at 10 microsecond intervals shown in FIG. 2c. In this manner the illuminator 20, may be utilized to provide sequences of pulses having variable effective pulse repetition frequencies.

The utility of employing the plurality of operating modes of the illuminator 20' at a wavelength of 0.4 microns is illustrated by FIG. 2d. Specifically, FIG. 2d is a graph which shows the differential velocity measurements which may be extracted as a function of the measurable Doppler shifts, with the illuminator PRF modes of FIGS. 2b and 2c as parameters. As shown in FIG. 2d the Doppler shifts of interest extend from 1 Hz to perhaps several MHz. Shifts of 1 Hz may be associated with small vibrations of large targets while those on the order of several MHz may be attributed to target rotations of the order of 1 rad/sec. As is evident upon inspection of FIG. 2d, more than two illuminator PRF modes could be required to span a differential velocity range of interest. Further, a low frequency PRF may be used to initially measure the respective ranges of targets within the field of view of the illuminator 20'. Range information from this initial measurement may then be used to program, with the aid of a digital computer, the illuminator 20' in a mode having an appropriate effective pulse repetition frequency.

A feature of the present invention which may be appreciated upon inspection of FIG. 1a occurs as a consequence of the closely matched propagation paths of the reference reflection R1' and the reflection R2. Specifically, this matching path length allows formation of a coherent interference pattern between the reflection R1' and the reflection R2 for a laser 20 coherence length approximately equal to the length of the pulse P. As mentioned in the Background of the Invention, laser illuminators used in conventional RD imaging systems are typically required to have coherence lengths approximately equal to the round trip distance to the target to be imaged. This coherence length requirement has effectively prevented visible laser illuminators from being employed in conventional long distance range Doppler imaging systems. In contrast, the self-referencing feature of the present invention enables utilization of visible illuminators in long range imaging applications.

Figure 3A:
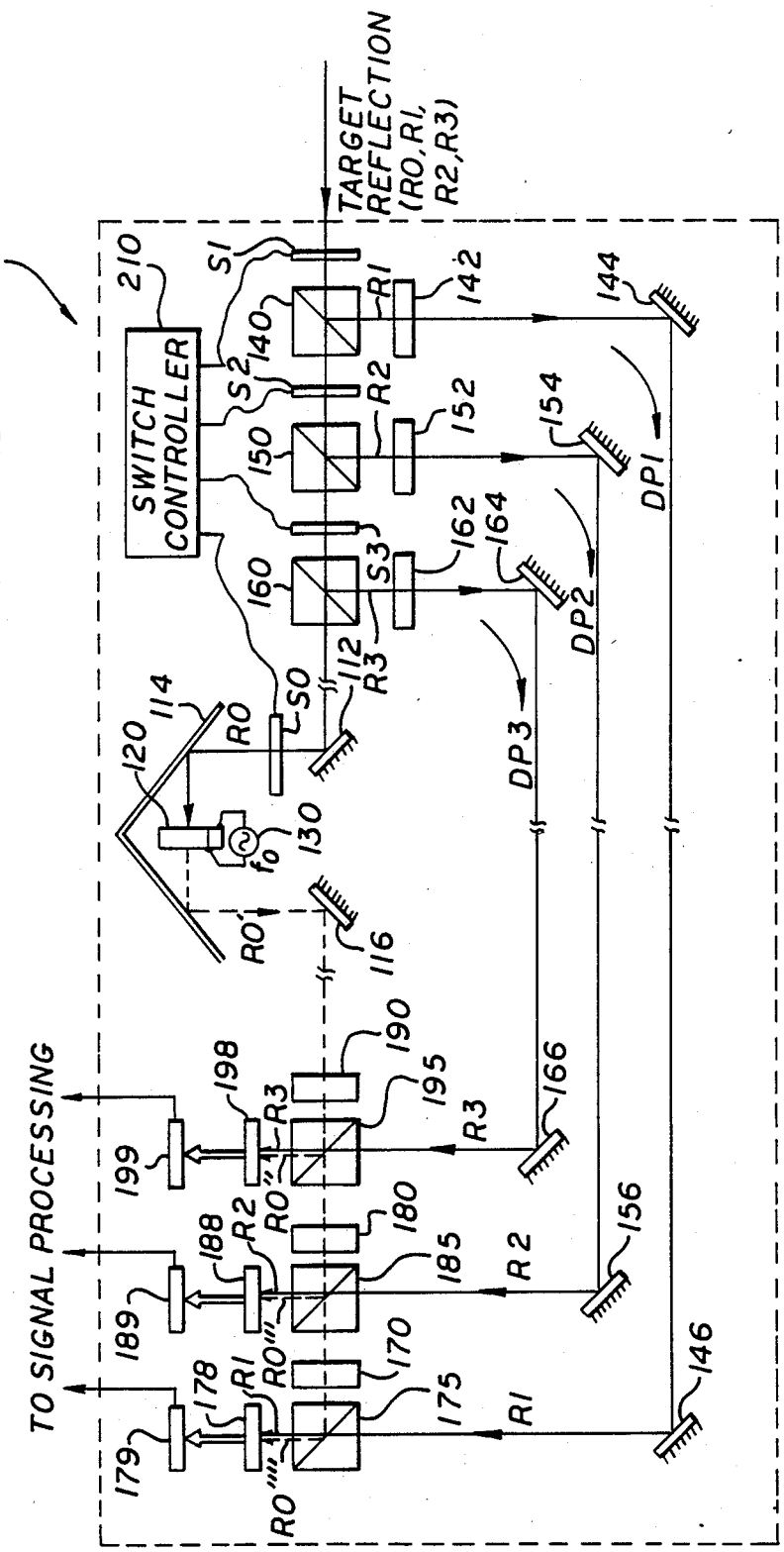
FIG. 3a is an illustrative representation of a preferred embodiment of the self-referencing target imaging system of the present invention.

While the simplified system 10 of FIG. 1a clearly illustrates the self-referencing feature of the present invention, FIG. 3a shows a preferred embodiment of the self-referencing target imaging system 100 of the present invention more suitable for practical application. In contrast with the system 10, the system 100 is disposed to simultaneously receive reflections from a reference surface and three range bins. As is discussed below, in the embodiment of FIG. 3a reflections from a target (not shown) under illumination as in FIG. 1a by a pulsed laser (not shown) impinge on the system 100. In the particular embodiment of FIG. 3a the reflections are received by the system 100 in the order R0, R1, R2 and R3 although the present invention is not limited to such a sequence. An optical switch network which includes high-speed optical switches S0, S1, S2 and S3 separates reflections R0, R1, R2, and R3 from the ensemble of target reflections produced by the incidence of each laser pulse upon the target. The reflections R1, R2 and R3 correspond to reflections from range bins offset from the origin of the reflection R0. The reflection R0 is redirected by a first planar mirror 112 and a V-shaped mirror 114 to a conventional acousto-optic Bragg cell modulator 120 positioned between interior surfaces of the mirror 114. The modulator 120 is driven by an acoustical generator 130 at a frequency $f_o$ and thus shifts the frequency of the reflection R0 by $f_o$ to create a reference reflection R0'. The reflection R0' is subsequently redirected by the V-shaped mirror 114 and a second planar mirror 116. Next, the reference reflection R0' is divided into the three portions R0'', R0''' and R0'''' by first, second and third adjustable polarizers 170, 180 and 190 in conjunction with first, second and third polarization sensitive beam splitters 175, 185 and 195.

The reflections R1, R2 and R3 are routed to optical delay paths of varying length by beam splitters 140, 150 and 160 and switches S0, S1, S2, and S3. A first optical delay path (DP1) for delaying the reflection R1 includes a first half wavelength polarizer 142 and first and second mirrors 144 and 146. The reflections R2 and R3 are delayed by first and second (DP1 and DP2) optical delay paths which include, respectively, second and third half wavelength polarizers 152 and 162, third and fourth mirrors 154 and 164, and fifth and sixth mirrors 156 and 166. The portions of the reference reflection R0'''', R0''' and R0'' respectively combine with the reflections R1, R2 and R3 to form first, second and third interference patterns after passing through first, second and third 45 degree polarizers 178, 188 and 198, respectively. The intensities of the first, second and third interference patterns are sensed by first, second and third noncoherent detectors 179, 189 and 199. Again, as was described with reference to FIG. 1a filters and amplifiers (not shown) centered about $f_o$ and coupled to the detectors 179, 189 and 199 may be used to extract the modulating envelope from each of the ensembles of current pulses emitted by the detectors 179, 189 and 199. These envelopes contain Doppler shift information pertaining to the relative motion (if any) of the target with respect to the range bins associated with the reflections R1, R2 and R3.

Figure 4A:
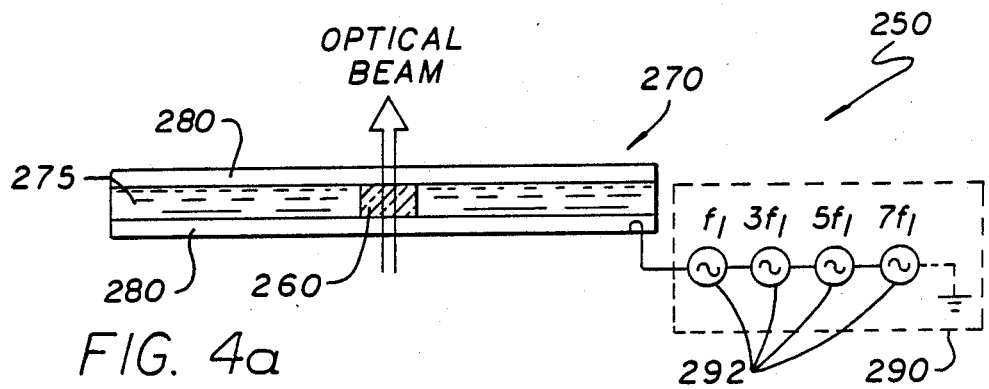
FIG. 4a is a sectional view of a high speed optical switch included within preferred embodiments of the present invention.
Figure 4B:
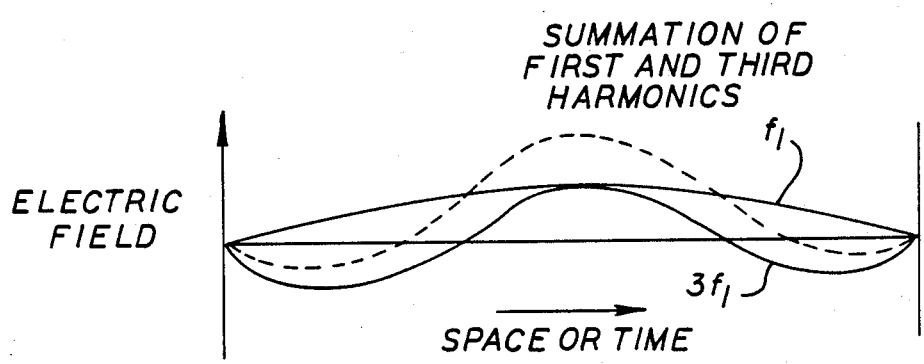

As is implied above, the optical switches S0, S1, S2 and S3 must be capable of repetitive operation at the pulse repetition frequency (PRF) of the laser illuminator in order to sequence the reflections R0, R1, R2 and R3 along the appropriate optical path. Conventional electro-optic crystals in conjunction with a suitable short pulse, high PRF, high voltage switch driver may be utilized for the optical switches of FIG. 3a. Alternatively, FIG. 4a shows a cross sectional view of a novel high speed electro-optical switch 250 adapted to more successfully meet the high PRF requirements of the above systems. The switch 250, shown in FIG. 4a under illumination by an optical beam, includes an electro-optic crystal 260 embedded in a TEM transmission line resonator 270. The transmission line 270 includes a dielectric layer sandwiched by a substrate 280. The transmission line 270 is resonant at the harmonics $f_1$, $3f_1$, $5f_1$, ... of the periodic waveform required to activate suitable polarization rotation in the electro-optic crystal 260. The switch 250 includes an electrical driver 290 having sinusoidal generators 292 at harmonics of the resonant frequency $f_1$ of the transmission line 270. The generator 290 is conventionally coupled to the transmission line 270 by an inductive loop. The Fourier components of the waveform required to activate the switch 250 are provided by the generators 292 and illustrated in FIG. 4b. Alternatively, the generator 290 may be adapted to directly provide the requisite time domain waveform. The realization of the switches S0, S1, S2 and S3 as in FIG. 4a. has the advantage of power conservation. That is, the reactive energy required to charge the electrode capacitance of the electro-optic crystal 260 is substantially recovered by the resonant operation of the switch 250.

In operation, the system 100 of FIG. 3a is designed to receive four of the reflections R0, R1, R2 and R3 from sequential range bins generated by incidence of each laser illuminator pulse upon the target to be imaged. For example, the arrival of the reflection R0 may be sensed by a detector (not shown) coupled to a switch controller 210. The switches S0, S1, S2 and S3 toggle between a "closed" fully transmissive state and an "open" fully reflective through suitable polarization rotation thereof. Initially, each of the switches S0, S1, S2 and S3 will be closed such that the reflection R0 may propagate directly through to the modulator 120 and be converted to the reference reflection R0'. The controller 210 may then open the switches S0, S2 and S3 such that the next reflection (R1) to arrive at the system 100 is allowed to propagate only along delay path DP1. With suitable timing circuitry the controller 120 may then activate switch S2, leaving switches S0 and S3 in the fully transmissive polarization state such that the reflection R2 experiences a rotated polarization and propagates along delay path DP2 upon reception by the system 100. Similar switch adjustments may be made to effect appropriate routing of the reflection R3. Further, following receipt of the reflection R3 the controller 210 may again activate the switches S0, S1, S2 and S3 in preparation for the arrival of the set of reflections engendered by the incidence of the next illuminator pulse on the target.

As is shown in FIG. 3a, the delay paths DP1, DP2 and DP3 include half wavelength polarizers 142, 152 and 162. The polarizers 142, 152 and 162 rotate the polarization of the reflections R1, R2 and R3 such that the reflections R1, R2 and R3 pass unattenuated through the polarization sensitive beam splitters 175, 185 and 195. In the particular embodiment of FIG. 3a the polarization sensitive beam splitters are realized by Glan-Thompson polarization sensitive beam splitters. Similarly, the polarizers 170, 180 and 190 are suitably adjusted such that desired portions of the reference reflection R0' are redirected to the 45 degree polarizers 178, 188 and 198 by the beam splitters 175, 185 and 195. The polarizers 178, 188 and 198 are included to respectively bring the reflections R1, R2 and R3 into polarization registration with the portions of the reference reflection R0'''', R0''' and R0''. That is, the respective pairs of reflections listed above are orthogonally polarized upon being brought into temporal coincidence within the beam splitters 175, 185 and 195 and will not coherently interfere until being placed in polarization registration by the polarizers 178, 188 and 198. Hence the system 100 is operative to divide a reference reflection from a target into three components which allows the generation of three detection envelopes (signals), each envelope carrying information pertaining to the relative motion of the target within a particular range bin.

Figure 3B:
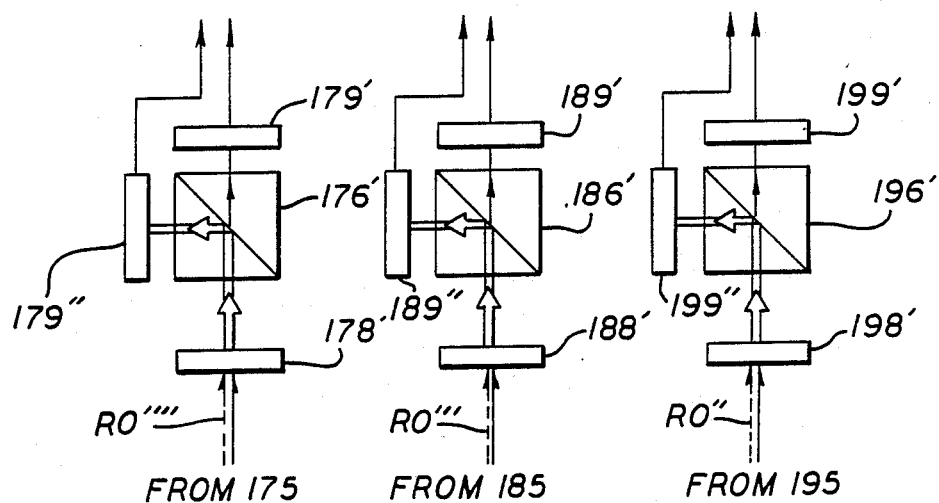
FIG. 3b illustrates an alternative target reflection combining arrangement which provides an enhanced signal-to-noise ratio.

The system 100 of FIG. 3a may be slightly modified to improve the signal to noise ratio of signals emitted by the detectors 179, 189 and 199. As shown in FIG. 3b, in a modified system 100' the polarizers 178, 188 and 198 are replaced by quarter wave Circular polarizers 178', 188' and 198'. The polarizers 178', 188' and 198' feed polarization sensitive beam splitters 176', 186' and 196'. The beam splitters 176', 186' and 196' each emit first and second sets of mutually phase shifted, copolarized beams to respective pairs of detectors 179' and 179'', 189' and 189'' and 199' and 199''. The outputs of each pair of detectors are 180 degree phase shifted replicas which can be combined electronically via an inverter to produce composite signals having enhanced signal to noise ratios.

Figures 5, 6:
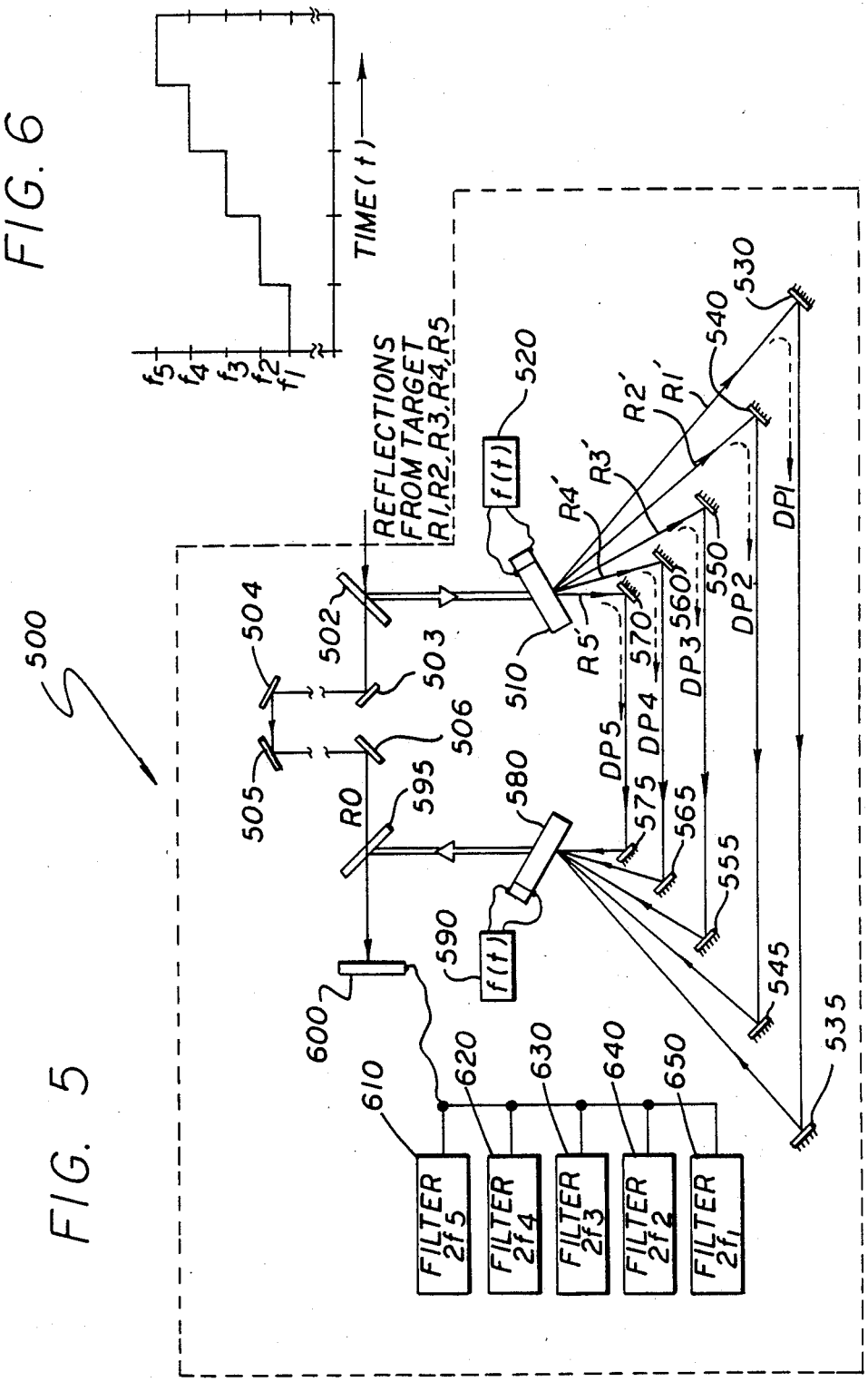
FIG. 5 is another preferred embodiment of the self-referencing target imaging system of the present invention.
FIG. 6 is a graph showing the acoustical frequencies applied to the acousto-optic modulators included within the embodiment of FIG. 5 as a function of time.

FIG. 5 shows an alternately preferred embodiment of the self-referencing target imaging system 500 of the present invention. In contrast with the system 100 of FIG. 3a, the system 500 is adapted to tag individual returning target reflections with differing intermediate frequencies. In this manner the system 500 employs a single detector to simultaneously detect reflections from a plurality of range bins. In the embodiment of FIG. 5 reflections from a target (not shown) under illumination as in FIG. 1a by a pulsed laser (not shown) are incident upon the system 500. In FIG. 5 each illuminator pulse generates a set of target reflections which include the reflections R0, R1, R2, R3, R4 and R5 from sequential range bins. Although in FIG. 5 the target reflections are received by the system 100 in the order R0, R1, R2, R3, R4 and R5, the system 500 is not limited to such a sequence.

As shown in FIG. 5, the system 500 includes a first beam splitter 502 which redirects the reflections R1, R2, R3, R4 and R5 to a first conventional acousto-optic Bragg cell modulator 510 driven by an acoustical generator 520. Additionally the first beam splitter 502, in conjunction with first, second, third and fourth reference delay mirrors 503, 504, 505 and 506 appropriately delays a selected reflection (conveniently R1) to serve as a reference reflection R0 as shown. The generator 520 is triggered to drive the modulator 510 with the waveform shown in FIG. 6 upon reception of the reflection R1. The generator 520 may be triggered by an optical detector (not shown). Application of the waveform to the modulator 510 by the generator 520 is timed such that the acoustical pulses of FIG. 6 reach the acousto-optical interaction volume of the modulator 510 in temporal coincidence with target reflections from sequential range bins. Hence, the target reflections are shifted in frequency in progressive steps as a function of range bin. More specifically, reflection R1 (from a first range bin) is shifted by $f_1$, reflection R2 is shifted by $f_2$, reflection R3 is shifted by $f_3$, reflection R4 is shifted by $f_4$, and reflection R5 is shifted by $f_5$. As a consequence of the above frequency shifts, the reflections R1, R2, R3, R4 and R5 are emitted in differing directions by the modulator 510 as the frequency shifted reflections R1', R2', R3', R4' and R5'. The redirection of the reflections R1, R2, R3, R4 and R5 by the modulator 510 enables the corresponding frequency shifted reflections R1', R2', R3', R4' and R5' to be delayed by optical delay paths DP1, DP2, DP3, DP4 and DP5. The optical delay paths DP1, DP2, DP3, DP4 and DP5 respectively include pairs of mirrors 530 and 535, 540 and 545, 550 and 555, 560 and 565, and 570 and 575. Further, the optical delay paths DP1, DP2, DP3, DP4 and DP5 allow the reflections R1', R2', R3', R4' and R5' to arrive in temporal coincidence at a second conventional acousto-optic Bragg cell modulator 580 driven by a second acoustical generator 590. The generator 590 drives the cell 580 at the frequencies $f_1$ through $f_5$.

The interference patterns generated within the modulator 580 are combined with the reference reflection R0 by a second beam splitter 595 and redirected to an optical detector 600. The detector 600 generates a series of current pulses in response to the interference patterns produced by successive sets of reflections R1', R2', R3', R4' and R5'. The series of current pulses generated by the detector is modulated by a composite envelope which includes the beat frequency components of the interference patterns illuminating the detector 600. This envelope includes the interference pattern beat frequencies $2f_5$, $2f_4$, $2f_3$, $2f_2$ and $2f_1$. The above beat frequencies are extracted from the composite envelope by filters 610, 620, 630, 640 and 650 connected in parallel to the detector 600. The extracted beat frequencies provided by the filters 610, 620, 630 and 640 include information regarding the relative motion (if any) of portions of the target being imaged within sequential range bins.

Although in the embodiment of FIG. 5 the the first reflection R1 within each set of reflections is selected as the reference reflection, it is understood that any of the remaining reflections R2 through R5 may also be chosen as a reference. The signal to noise ratios of the beat signals extracted by the filters 610, 620, 630, 640 and 650 are improved by selecting reflections of relatively high intensity as reference reflections.

FIG. 7 is an illustrative representation of a second alternately preferred embodiment of the self-referencing target imaging system 700 of the present invention. In a manner similar to that described with reference to FIG. 3a first, second, third and fourth integrated-optic waveguide-coupling switches 710, 711, 712 and 713 route sequentially received target reflections along first, second, third and fourth fiber optic delay lines 720, 730, 740 and 750. The waveguide switches 710, 711, 712 and 713 are operatively coupled by optic fiber 715. Again, a reference reflection is selected from the ensemble of target reflections by the switch 710 and routed along a reference delay path 760. The reference reflection is frequency shifted by a conventional acousto-optic Bragg cell modulator 770 driven by an acoustical generator 780 at an intermediate frequency $\omega_{IF}$. The reference reflection is separated into multiple components by beam splitters 790 and guided by fiber optic lines 795 to first, second third and fourth beam recombiners 800, 810, 820 and 830. The combiners 800, 810, 820 and 830 allow interference patterns to develop between components of the reference reflection and the reflections delayed on the first, second, third and fourth fiber optic delay lines 720, 730, 740 and 750, respectively. First, second, third and fourth detectors 850, 860, 870 and 880 fiber optically coupled to the beam combiners 800, 810, 820 and 830 generate sequences of current pulses in response to the interference patterns fostered thereby. As was described with reference to FIG. 3a, appropriate signal processing may be employed to extract target information from the current pulse sequences provided by the detectors 850, 860, 870 and 880.

The integrated-optic waveguide-coupling switches included within the system 700 are commercially available and afford advantages relative to other modes of high-speed switching. In particular the required switching voltages of guided-wave devices are typically low (a few volts), thus obviating the need for powerful switch drivers or for concern regarding power dissipation.

Further, a wide variety of PRF waveforms are readily accommodated. Additionally, the mechanical flexibility of the fiber-optic delay lines allows a compact physical implementation of the system 700.

In the preferred embodiments disclosed herein the electro-optic switches are preferably realized by transverse electro-optic modulators (modulating field applied normal to direction of light propagation). Transverse electro-optic modulators employ suitably electro-optic crystals such as $KH_2PO_4$ ( see e.g. A. Yariv, *Introduction to Optical Electronics*). The polarizers and beam splitters referred to herein are commercially available and familiar to those skilled in the art.

Thus the present invention has been described with reference to a particular embodiment in connection with a particular application. Those having ordinary skill in the art and access to the teachings of the present invention will recognize additional modifications and applications within the scope thereof. For example, the particular optics used to separate, redirect and delay target reflections may be altered without departing from the scope of the present invention. Similarly, the invention is not limited to the particular pulsed illumination formats disclosed herein. Those skilled in the art may be aware of other illumination schemes which optimize the range of differential Doppler velocities which may be detected in particular imaging applications. Additionally, optical phase/frequency shifting elements having other suitable modulation properties may be appropriate for inclusion in alternative embodiments of the present invention. Additionally, with access to the teachings herein it may also be apparent to one skilled in the art to adapt the high speed electro-optic switches disclosed herein for utilization in other optical signal processing applications.

It is therefore contemplated by the appended claims to cover any and all such modifications.

Accordingly, what is claimed is:

1. A self-referencing target imaging system comprising:
    transmitter means for illuminating a target with a series of electromagnetic pulses;
    first beamsplitter means for redirecting first and second reflections of each of said pulses from first and second portions of said target, respectively;
    modulator means for shifting the frequency of each of said first reflections to produce a reference reflection corresponding to each of said pulses;
    means for combining respectively the reference and the second reflections of each of said pulses;
    means for detecting said respectively combined reflections to generate an imaging signal.

2. The imaging system of claim 1 wherein said means for respectively combining further includes:
    delay line means for bringing the reference signal and second reflection formed from each pulse of said series of illuminating pulses into mutual spatial and temporal registration to generate a series of interference patterns;
    means for detecting the intensity of said series of interference patterns to form said imaging signal.

3. The imaging system of claim 1 wherein said means for receiving includes:
    a first beam splitter positioned in optical alignment between said transmitter means and said target;
    a second beam splitter positioned in optical alignment with said first beam splitter.

4. The imaging system of claim 1 wherein said frequency shifting means includes an acousto-optic modulator.

5. The imaging system of claim 2 wherein said means for detecting includes:
   a noncoherent optical detector;
   a filter coupled to said noncoherent detector and centered at or near the frequency of said imaging signal.

6. A self-referencing target imaging system comprising:
   transmitter means for illuminating a target with a series of electromagnetic pulses to generate a set of reflections with each of said pulses;
   means for receiving said sets of reflections;
   means for shifting the frequency of one of said reflections within each of said sets of reflections to provide a reference reflection for each of said sets of reflections;
   means for splitting each of said reference reflections into a number of portions;
   switchable delay line means for bringing respective portions of said reference reflection into mutual spatial and temporal registration with each of the remaining reflections within said set of reflections;
   means for combining said spatially and temporally registered reflections to generate a set of interference patterns corresponding to each of said sets of reflections; and
   means for detecting said interference patterns.

7. The imaging system of claim 6 wherein said means for splitting includes a plurality of adjustable polarizers in optical alignment with a plurality of polarization sensitive beam splitters.

8. The imaging system of claim 6 wherein said switchable delay line means includes a plurality of optical switches in optical alignment with a plurality of beam splitters.

9. The imaging system of claim 8 wherein said switchable delay line means includes arrangements of mirrors and a first set of polarizers in optical alignment with said beam splitters and said polarization sensitive beam splitters.

10. The imaging system of claim 8 wherein said optical switches each respectively include an electro-optic crystal embedded in a transmission line.

11. The imaging system of claim 10 wherein each of said optical switches include means for driving said respective transmission line with a plurality of the harmonics thereof.

12. The imaging system of claim 8 wherein said means for combining includes said polarization sensitive beams splitters and a second set of polarizers in optical alignment therewith.

13. The imaging system of claim 6 wherein said transmitter means includes:
    oscillator means for generating a set of optical optical pulses;
    optical switch means for transmitting subsets of said set of optical pulses;
    laser amplifier means for amplifying said subsets of optical pulses.

14. A self-referencing target imaging system comprising:
    transmitter means for illuminating a target with a series of electromagnetic pulses to generate a set of reflections with each of said pulses;
    means for receiving said sets of reflections, including means for sensing the receipt of the first reflection within each set of reflections;
    means for shifting the frequency of each reflection within each of said reflection sets
    means for delaying each reflection within each of said reflection sets to bring the reflections within each of said reflection sets into temporal and spatial registration;
    means for combining one of said frequency shifted reflections in each of said reflection sets with the remaining frequency shifted reflections of said reflection set to generate a a plurality of interference patterns of differing beat frequencies; and
    means for detecting said interference patterns, including means for extracting said beat frequencies from said detected interference patterns.

15. The imaging system of claim 14 wherein said means for shifting includes a first acousto-optic modulator and said means for combining includes a second acousto-optic modulator.

16. A self-referencing method of imaging a target comprising the steps of:
    (a) illuminating said target with a set of electromagnetic pulses;
    (b) receiving first and second reflections of each of said pulses from first and second portions of said target, respectively;
    (c) shifting the frequency of each of said first reflections to produce a reference reflection corresponding to each of said pulses;
    (d) respectively combining the reference and the second reflections of each of said pulses to generate an imaging signal.

17. The method of claim 16 wherein said step of respectively combining further includes the steps of:
    (a) bringing the reference signal and second reflection formed from each pulse of said series of illuminating pulses into mutual spatial and temporal registration to generate a series of interference patterns;
    (b) detecting the intensity of said series of interference patterns to form said imaging signal.

18. The method of claim 16 wherein said step of illuminating said target further includes the steps of:
    (a) generating a first set of electromagnetic pulses;
    (b) transmitting subsets of said first set of electromagnetic pulses;
    (c) amplifying said transmitted subsets of pulses.

19. The method of claim 16 wherein said step of illuminating said target further includes the step of:
    (a) adjusting the numbers of pulses within said subsets of pulses in response to pulse reflections from said target.

20. A self-referencing method of imaging a target comprising the steps of:
    (a) illuminating said target with a series of electromagnetic pulses to generate a set of reflections with each of said pulses;
    (b) receiving said sets of reflections;
    (c) shifting the frequency of one of said reflections within each of said sets of reflections to provide a reference reflection for each of said sets of reflections;
    (d) splitting each of said reference reflections into a number of portions;
    (e) bringing respective portions of said reference reflection into mutual spatial and temporal registration with each of the remaining reflections within said set of reflections;

(f) combining said spatially and temporally registered reflections to generate a set of interference patterns corresponding to each of said sets of reflections;

(g) detecting said interference patterns.

21. A self-referencing method of imaging a target comprising the steps of:

(a) illuminating a target with a series of electromagnetic pulses to generate a set of reflections with each of said pulses;

(b) receiving said sets of reflections, including means for sensing the receipt of the first reflection within each set of reflections;

(c) shifting the frequency of each reflection within each of said reflection sets;

(d) delaying each reflection within each of said reflection sets to bring the reflections within each of said reflection sets into temporal and spatial registration;

(e) combining one of said frequency shifted reflections in each of said reflection sets with the remaining frequency shifted reflections of said reflection set to generate a a plurality of interference patterns of differing beat frequencies;

(f) detecting said interference patterns, including means for extracting said beat frequencies from said detected interference patterns.

* * * * *

UNITED STATES PATENT AND TRADEMARK OFFICE
CERTIFICATE OF CORRECTION

PATENT NO. : 4,906,092
DATED : March 6, 1990
INVENTOR(S) : THOMAS R. O'MEARA

It is certified that error appears in the above-identified patent and that said Letters Patent is hereby corrected as shown below:

Col. 11, line 58, delete "optical" first occurrence.

Signed and Sealed this

Fifth Day of April, 1994

Attest:

*Attesting Officer*

BRUCE LEHMAN

*Commissioner of Patents and Trademarks*